United States Patent
Yoshimura

(10) Patent No.: US 9,910,556 B2
(45) Date of Patent: Mar. 6, 2018

(54) MOUSE CURSOR CONTROL METHOD AND APPARATUS

(71) Applicant: FUJITSU LIMITED, Kawasaki-shi, Kanagawa (JP)

(72) Inventor: Osamu Yoshimura, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 475 days.

(21) Appl. No.: 14/465,497

(22) Filed: Aug. 21, 2014

(65) Prior Publication Data

US 2014/0365931 A1    Dec. 11, 2014

Related U.S. Application Data

(63) Continuation of application No. PCT/JP2012/060453, filed on Apr. 18, 2012.

(51) Int. Cl.
  *G06F 3/048*   (2013.01)
  *G06F 3/0481*  (2013.01)
  *G06F 3/0484*  (2013.01)
  *G06F 3/0489*  (2013.01)

(52) U.S. Cl.
  CPC ......... *G06F 3/0481* (2013.01); *G06F 3/0484* (2013.01); *G06F 3/04812* (2013.01); *G06F 3/04842* (2013.01); *G06F 3/04892* (2013.01)

(58) Field of Classification Search
  CPC .. G06F 3/0481; G06F 3/0484; G06F 3/04842; G06F 3/04812; G06F 3/04892
  See application file for complete search history.

(56) References Cited

U.S. PATENT DOCUMENTS

| 5,198,802 A | 3/1993 | Bertram et al. |
| 5,596,347 A * | 1/1997 | Robertson ........... G06F 3/04812 345/157 |
| 7,904,835 B1 * | 3/2011 | Dhawan ................ G06F 3/038 715/756 |
| 2003/0020766 A1 * | 1/2003 | Maehiro ............. G06F 3/04812 715/858 |
| 2007/0220448 A1 * | 9/2007 | Trewin ................ G06F 3/04842 715/856 |

(Continued)

FOREIGN PATENT DOCUMENTS

| JP | 03-191411 A | 8/1991 |
| JP | 11-065800 A | 3/1999 |

(Continued)

OTHER PUBLICATIONS

International Search Report of PCT/JP2012/060453 dated Jul. 24, 2012.

*Primary Examiner* — William Bashore
*Assistant Examiner* — Gregory A Distefano
(74) *Attorney, Agent, or Firm* — Maschoff Brennan

(57) ABSTRACT

A method for controlling a mouse cursor in this invention includes: upon detecting an event that represents a focus was moved between plural objects displayed on a screen, identifying an object of a movement destination of the focus; identifying a position of the object of the movement destination; setting an end point to which a mouse cursor is moved, based on the identified position of the object of the movement destination; and performing first movement of the mouse cursor to a position that is nearer to the end point, plural times, until the position of the mouse cursor reaches the end point.

6 Claims, 19 Drawing Sheets

(56) References Cited

U.S. PATENT DOCUMENTS

| | | | |
|---|---|---|---|
| 2009/0249257 A1* | 10/2009 | Bove | G06F 3/04812 715/858 |
| 2010/0017757 A1* | 1/2010 | Basson | G06F 3/04812 715/858 |
| 2010/0070922 A1* | 3/2010 | DeMaio | G06F 3/0482 715/811 |
| 2011/0164063 A1 | 7/2011 | Shimotani et al. | |
| 2011/0289453 A1 | 11/2011 | Takizawa et al. | |
| 2013/0125066 A1* | 5/2013 | Klein | G06F 3/04812 715/862 |

FOREIGN PATENT DOCUMENTS

| | | |
|---|---|---|
| JP | 2004-295631 A | 10/2004 |
| JP | 2006-235832 A | 9/2006 |
| JP | 2006-235863 A | 9/2006 |
| JP | 2008-176577 A | 7/2008 |
| JP | 2009-017463 A | 1/2009 |
| JP | 2011-243070 A | 12/2011 |
| WO | 2010/064387 A1 | 6/2010 |

\* cited by examiner

MOUSE CURSOR CONTROL METHOD AND APPARATUS

CROSS-REFERENCE TO RELATED APPLICATIONS

This application is a continuing application, filed under 35 U.S.C. section 111 (a), of International Application PCT/JP2012/060453, filed on Apr. 18, 2012, the entire contents of which are incorporated herein by reference.

FIELD

This technique relates to control of a mouse cursor in a computer that has a graphical user interface.

BACKGROUND

In a computer that has a graphical user interface, a window or a dialog box has plural objects such as buttons, text input fields. In such a case of the window or dialog box, a user can input data into or select only an object being focused. Therefore, unless the user recognizes what object is being focused at that time, the user cannot operate normally.

However, it is difficult to visually recognize what object is being focused, frequently. For example, the focus may be displayed by surrounding an area of the object by a dotted line. However, because the surrounding by the dotted line is not conspicuous, the user may not intuitively understand that the object is being focused.

Moreover, in a graphical user interface in which the focus can be moved between objects by a key operation such as a short-cut key, acceleration key, or tab operation (tab key or shift-key+tab key), the user frequently loses sight of the movement of the focus by the key operation.

For example, when order to move the focus between objects has no ordinarily, the user is apt to lose sight of the position of the focus. This situation frequently occurs when a creator of the program does not pay attention to the order to move the focus, or when the program is unintentionally modified, or the like.

Moreover, also in a screen in which the arrangement of the objects is not regular, it is difficult to predict the movement destination of the focus by the user's key operation, and the user is apt to lose sight of the position of the focus.

Thus, the movement of the focus between objects by the key operation has benefit that time and effort can be omitted for the user who is habituated to doing so. However, it also has a defect that the user who is not habituated to doing so cannot recognize a target object of the data input or selection, and confuses the target object.

Patent Document 1: Japanese Laid-open Patent Publication No. 03-191411

Patent Document 2: Japanese Laid-open Patent Publication No. 2008-176577

In other words, the conventional art cannot prevent the user from losing sight of the movement destination of the focus that moves between plural objects.

SUMMARY

A mouse cursor control method relating to one aspect of this technique includes: (A) upon detecting an event that represents a focus was moved between plural objects displayed on a screen, identifying an object of a movement destination of the focus; (B) identifying a position of the object of the movement destination; (C) setting an end point to which a mouse cursor is moved, based on the position of the object of the movement destination; and (D) performing first movement of the mouse cursor to a position that is nearer to the end point, plural times, until the position of the mouse cursor reaches the end point.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

[Embodiment 1]

In this embodiment, an example will be explained that a mouse cursor controller is provided in an application program for causing a screen to be displayed. The mouse cursor controller controls the mouse cursor so that the mouse cursor automatically moves toward an object to which the focus has been moved, when the focus moves between objects that are displayed on a screen. By the control by the mouse cursor controller, the mouse cursor moves to the movement destination of the focus, while following the movement of the focus.

Figure 1:
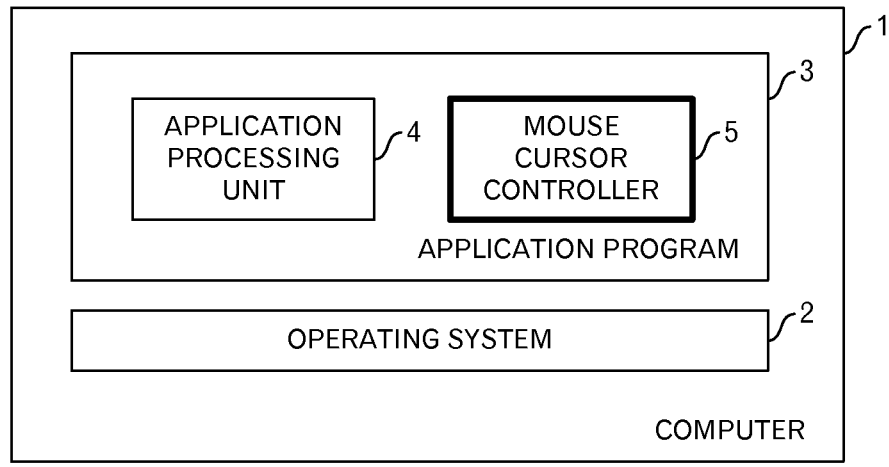
FIG. 1 is a diagram depicting a configuration example of programs in a first embodiment.

FIG. 1 illustrates a configuration example of programs in the first embodiment. A computer 1 has an operating system 2 and an application program 3.

The operating system 2 has a function to support the graphical user interface. For example, the operating system 2 conducts screen control such as the movement of the focus and operates to notify the application program 3 of an event, which occurs by the movement of the focus, the movement of the mouse, a timer or the like, in a message format.

The application program 3 includes an application processing unit 4 and a mouse cursor controller 5, and by executing the application program 3, the application processing unit 4 and the mouse cursor controller 5 are realized in the computer 1.

The application processing unit 4 performs a main processing of the application function. The application processing unit 4 accepts input or selection of data in order to realize the application function. Therefore, the application processing unit 4 is configured to display a window or dialog box, which includes plural objects, on a screen through the operating system 2, and accept the input or selection of data by the operation of the user, and perform a data processing based on the accepted input or selection of data.

The mouse cursor controller 5 is a module for performing control so that the mouse cursor follows or tracks an object that became a movement destination of the focus, without any relation with the functions of the application.

Figure 2:
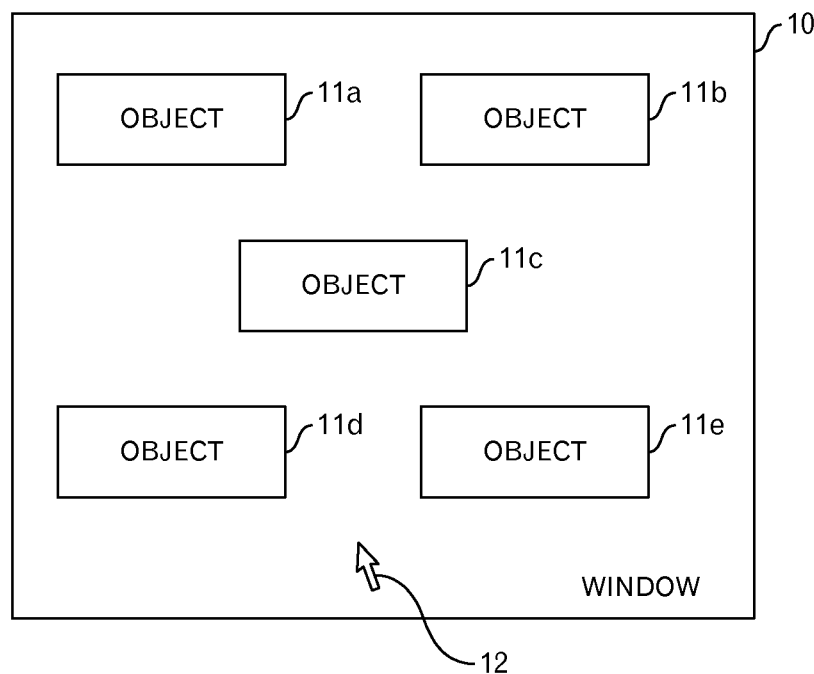
FIG. 2 is a diagram depicting an example of a window including plural objects.

FIG. 2 illustrates an example of a window that is displayed on the screen. In a window 10, plural objects 11a to 11e are arranged. For example, when a tab key is pushed, the focus is moved in sequence among the object 11a to 11e. The order of the movement depends mainly on the application program.

When the movement of the focus occurs among the objects 11 by the key operation, the mouse cursor 12 begins moving toward the object 11 that is being focused, and moves within the object 11 or up to the neighborhood of the object 11.

The speed of the movement may always be constant, may be determined according to the distance from a start point to an end point, or may vary during the movement. Especially, by making the movement speed slow around the end point, the attention to the end point may be gathered.

The shape or form of the mouse cursor 12 may be changed at the beginning of the movement in order to make it possible for the user to recognize that the mouse cursor 12 is moving toward the object 11. Moreover, animation display of the mouse cursor 12 may be made at the end of the movement in order to make it possible for the user to recognize that the position is the end point.

Figure 3:
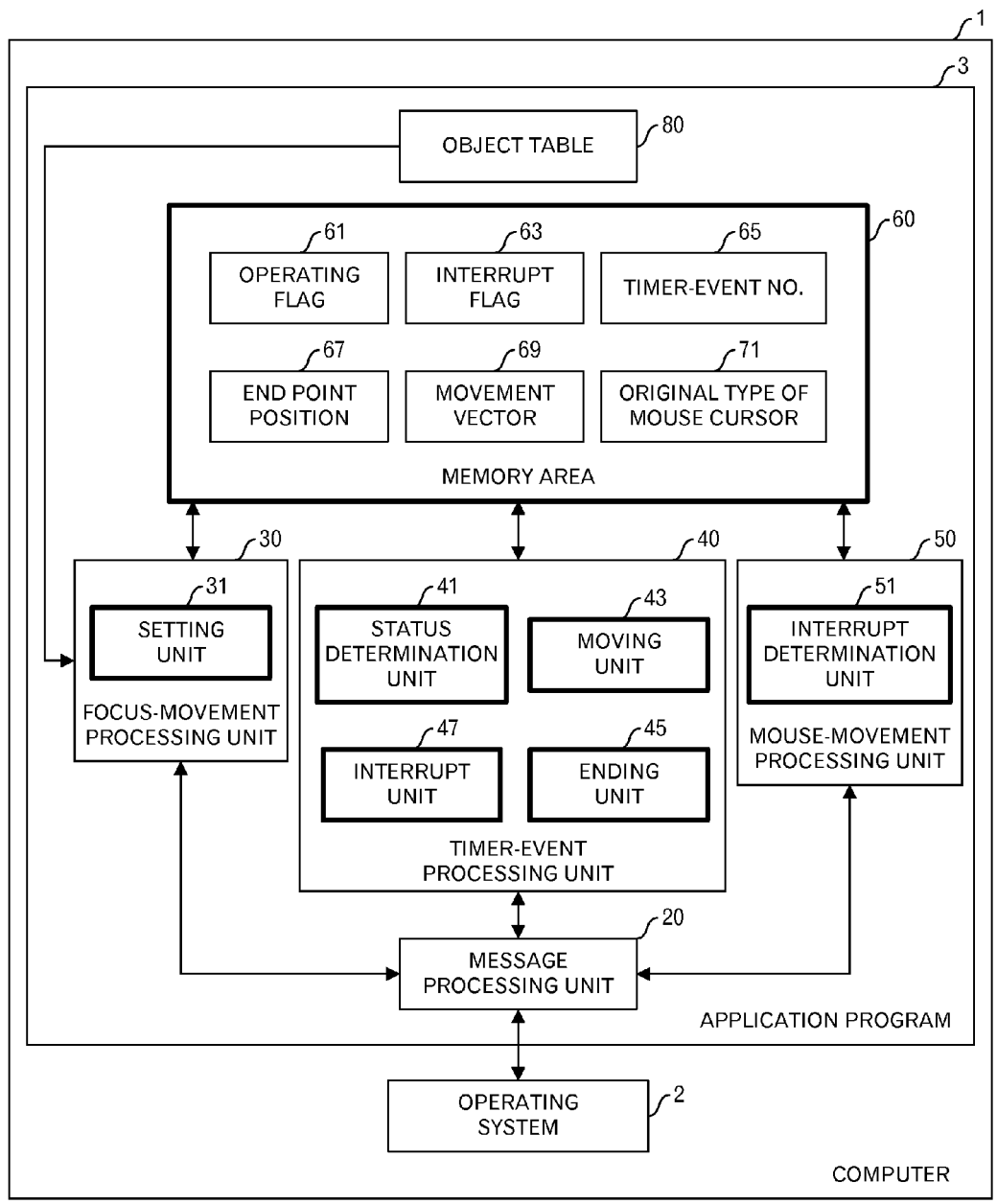
FIG. 3 is a diagram depicting a configuration example of an application program in the first embodiment.

Next, a configuration of the application program 3, mainly the mouse cursor controller 5, will be explained. FIG. 3 illustrates a configuration example of the application program 3 in the first embodiment.

As illustrated in FIG. 3, the application program 3 has a message processing unit 20, a focus-movement processing unit 30, a timer-event processing unit 40, a mouse-movement processing unit 50, a memory area 60 and an object table 80. Modules, which are surrounded by thick lines in this figure, are parts of the mouse cursor controller 5.

The message processing unit 20 receives a message concerning an event from the operating system 2, and distributes the event to either event processing unit such as the focus-movement processing unit 30, timer-event processing unit 40, mouse-movement processing unit 50 or the like depending on contents of the event.

When the message represents an event of the focus movement, the focus-movement processing unit 30 operates according to that event. The focus-movement processing unit 30 has a setting unit 31 that is a part of the mouse cursor controller 5. The setting unit 31 operates to perform setting to automatically move the mouse cursor 12.

When the message represents the timer event, the timer-event processing unit 40 operates according to that event. The timer-event processing unit 40 has a status determination unit 41, moving unit 43, ending unit 45 and interrupt unit 47, which are parts of the mouse cursor controller 5.

The status determination unit 41 determines the status concerning the control of the mouse cursor 12. The moving unit 43 moves the mouse cursor 12 through the operating system 2. The ending unit 45 ends the control of the mouse cursor 12. The interrupt unit 47 interrupts the control of the mouse cursor 12.

When the message represents an event of the mouse movement, the mouse-movement processing unit 50 operates according to that event. The mouse-movement processing unit 50 has an interrupt determination unit 51 that is a part of the mouse cursor controller 5. The interrupt determination unit 51 detects the user's mouse operation, and determines the interrupt.

The memory area 60 is an area to store data used for the control in the mouse cursor controller 5. The memory area 60 is configured to store an operating flag 61, an interrupt flag 63, a timer-event number 65, an end point position 67, a movement vector 69 and an original type of the mouse cursor 71.

The operating flag 61 is a flag to determine whether or not the control of the mouse cursor 12 is operating. The interrupt flag 63 is a flag to determine whether or not the control of the mouse cursor 12 is interrupted. The timer-event number 65 is a number of the timer event used for the control of the mouse cursor 12. The end point position 67 is an end point of the movement of the mouse cursor. The movement vector 69 is a vector from the start point to the end point in one movement of the mouse cursor 12. When the mouse cursor 12 moves at constant speed, one common movement vector is kept, and when the mouse cursor 12 moves while changing the speed, plural movement vectors are kept. The original type of the mouse cursor 71 is a type of the mouse cursor before the beginning of the movement of the mouse cursor 12.

The object table 80 stores information of the objects 11 included in the window and/or dialog box, which are displayed by the application processing unit 4. The information of the objects 11 includes a size, position and type of the object, for example. Regardless of the presence of the mouse cursor controller 5, the application processing unit 4 operates using the object table 80, normally.

Figure 4:
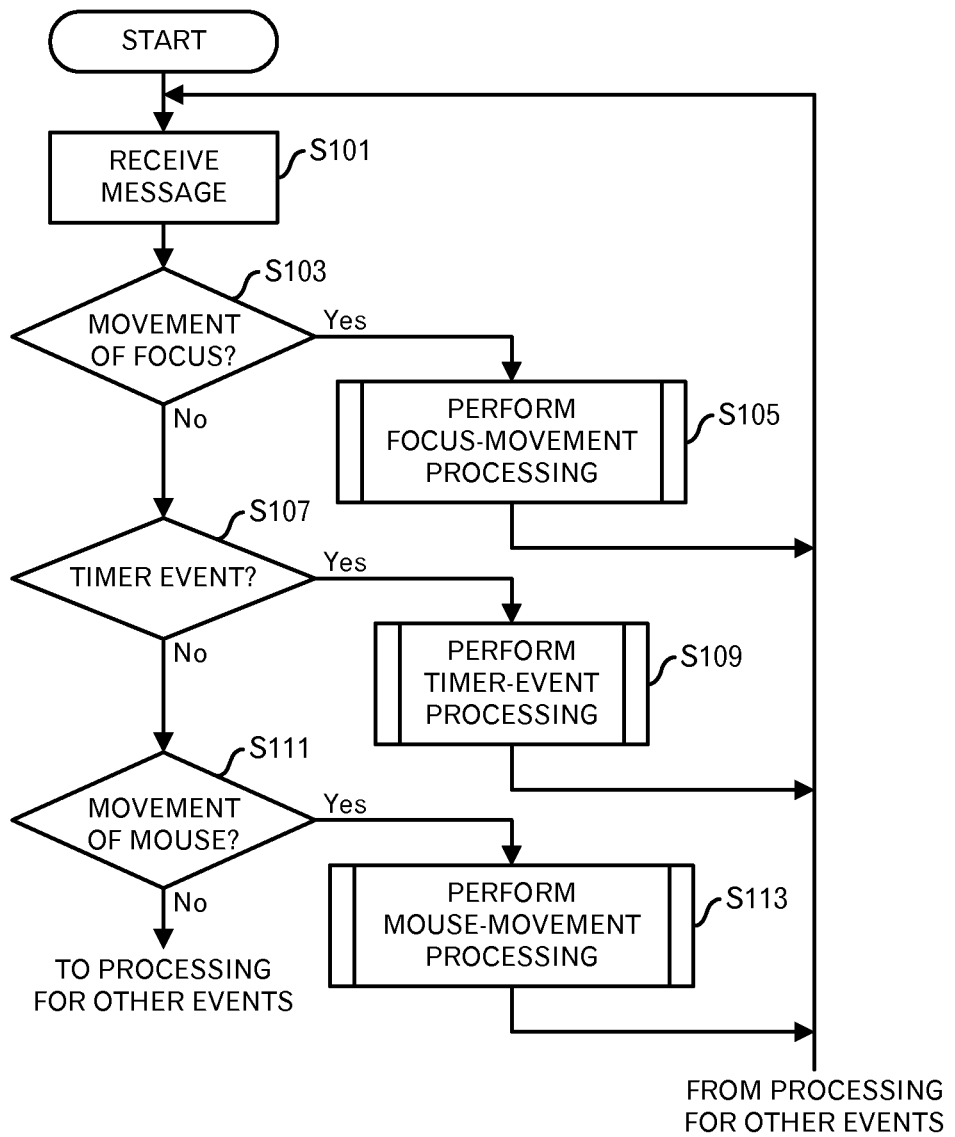
FIG. 4 is a diagram depicting a processing flow of a message processing.

Next, a processing of the message processing unit 20 will be explained. FIG. 4 illustrates an example of a message processing by the message processing unit 20.

The message processing unit 20 accepts a message that is notified from the operating system 2 to its own process (S101). Then, the message processing unit 20 reads the contents of the event, which is included in the message, and distributes a processing according to the type of the event.

As illustrated in FIG. 4, the message processing unit 20 determines whether or not the contents of the event represent the movement of the focus (S103), and when the contents of the event represent the movement of the focus, the processing shifts to a focus-movement processing (S105) by the focus-movement processing unit 30. After the focus-movement processing (S105), the processing returns to the receipt of the message by the message processing unit 20 (S101).

On the other hand, when the contents of the event do not represent the movement of the focus, the message processing unit 20 determines whether or not the contents of the event represent the timer event (S107). When the contents of the event represent the timer event, the processing shifts to a timer-event processing (S109) by the timer-event processing unit 40. After the timer-event processing (S109), the processing returns to the receipt of the message by the message processing unit 20 (S101).

On the other hand, when the contents of the event do not represent the timer event, the message processing unit 20 determines whether or not the contents of the event represent the mouse movement (step S111), and when the contents of the event represent the mouse movement, the processing shifts to a mouse-movement processing by the mouse-movement processing unit 50 (S113). After the mouse-movement processing (S113), the processing returns to the receipt of the message by the message processing unit 20 (S101).

On the other hand, when the contents of the event do not represent the mouse movement, the processing normally shifts to determination about other events. However, this determination does not relate to the operation of the mouse cursor controller 5, so the explanation is omitted. However, when the determination about other events is performed and a processing for that event is performed, the processing returns to the receipt of the message by the message processing unit 20 (S101).

Thus, the message processing unit 20 performs control to distribute the event to a processing for the event according to the contents of the message. However, the order of the determination about the event is not limited to this example, and another order may be employed.

Next, the focus-movement processing by the focus-movement processing unit 30 (S105) will be explained. Firstly, the detection of the movement of the focus is a trigger of the control of the mouse cursor 12.

Figure 5:
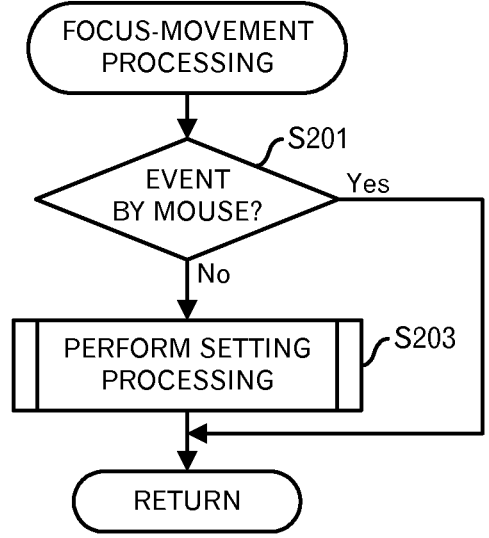
FIG. 5 is a diagram depicting a processing flow of a focus-movement processing.

FIG. 5 is a diagram depicting a processing flow of the focus-movement processing. The focus-movement processing unit 30 determines whether or not this is an event by the mouse (S201). The mouse is an example of a device for inputting an instruction to move the mouse cursor 12. Otherwise, also in case of a flat point, mouse tablet or the like, the determination may be made similarly to the mouse. In the following, the similar handling is made.

The event of the focus movement includes information of a device that instructed the focus movement. It is possible to distinguish the focus movement by the mouse operation and the focus movement by the key operation based on the information of the device.

In case of the focus movement by the mouse operation, the movement of the mouse cursor by this control that is linked with the focus movement is not performed in order to avoid the user's confusion.

In case of the focus movement that is not caused by the mouse operation, the processing shifts to a setting processing (S203) by the setting unit 31. Thus, incase of the focus movement by the key operation, the setting processing (S203) by the setting unit 31 is performed.

By performing the aforementioned determination, the mouse cursor moves together when the focus moves by the key operation such as short-cut key, an acceleration key, or tab operation (tab key or shift key+tab key).

Furthermore, even when the focus automatically moves after detecting that the number of numbers that were inputted into a number input field exceeds a predetermined number or the number of characters that were inputted into a text input field exceeds a predetermined number, the mouse cursor 12 moves together.

Figure 6:
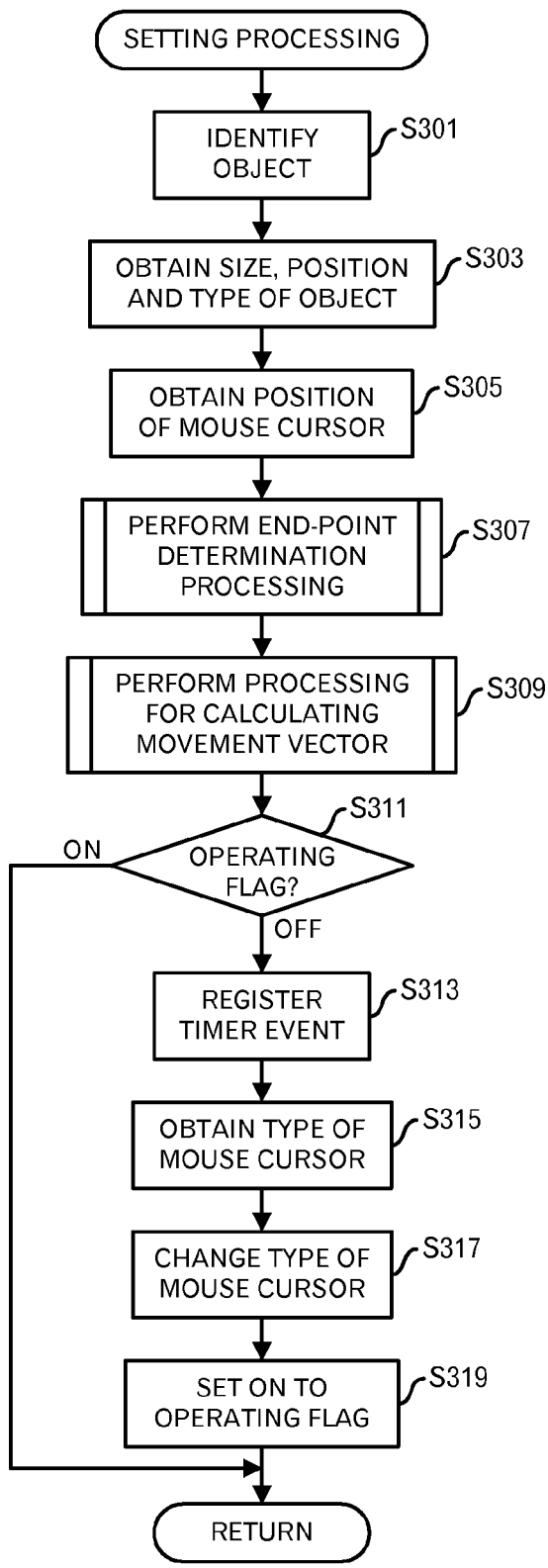
FIG. 6 is a diagram depicting a processing flow of a setting processing.

Next, the setting processing (S203) by the setting unit 31 will be explained. FIG. 6 illustrates a processing flow of the setting processing. Firstly, the setting unit 31 identifies an object 11 of the movement destination (S301). Information representing the object 11 of the movement destination is included in the event of the focus movement, therefore, the setting unit 31 reads this information.

The setting unit 31 further obtains information of the size, position and type of the object of the movement destination from the object table 80 (S303).

There are some kinds of objects 11. FIGS. 7 to 10 illustrate an example that the focus is displayed in the check box, an example that the focus is displayed in the radio button, an example that the focus is displayed in the button and an example that the focus is displayed in the text input field.

Figure 7:
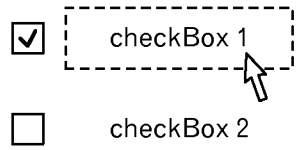
FIG. 7 is a diagram depicting an example that the focus is displayed in a check box.
Figure 8:
FIG. 8 is a diagram depicting an example that the focus is displayed in a radio button.
Figure 9:
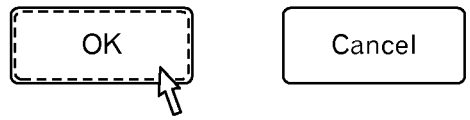
FIG. 9 is a diagram depicting an example that the focus is displayed in a button.
Figure 10:
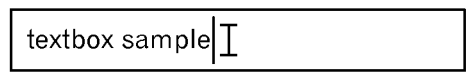
FIG. 10 is a diagram depicting an example that the focus is displayed in a text input field.

In FIG. 7, a dotted frame represents the focus is on the check box "checkBox1". In FIG. 8, a dotted frame represents the focus is on the radio button "radioButton1". In FIG. 9, a dotted frame represents the focus is on the "OK" button. In FIG. 10, a caret on the end of "textbox sample" blinks, however, because there is no dotted frame, it is difficult to recognize the focus.

Returning to FIG. 6, the setting unit 31 obtains the position of the mouse cursor 12 from the operating system 2 (S305). Furthermore, the setting unit 31 determines the end point that is the movement destination of the mouse cursor 12 by an end-point determination processing (S307).

Figure 11:
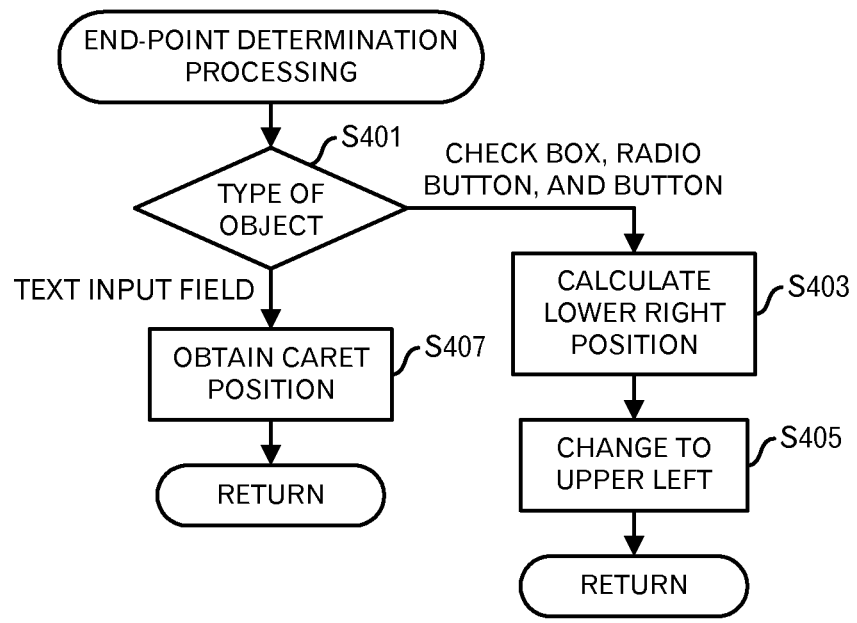
FIG. 11 is a diagram depicting a processing flow of an end-point determination processing.

The end-point determination processing (S307) will be explained. FIG. 11 illustrates a processing flow of the end-point determination processing. In this example, the setting unit 31 determines whether the type of the object 11 is the check box, radio button, button or text input field (S401).

Firstly, a processing in case where the type of the object is either of the check box, radio button and button will be explained. In case of these objects, by displaying the mouse cursor 12 near the lower right of the object 11, it is avoided that the mouse cursor 12 overlaps with the display of the object 11.

Figure 12:
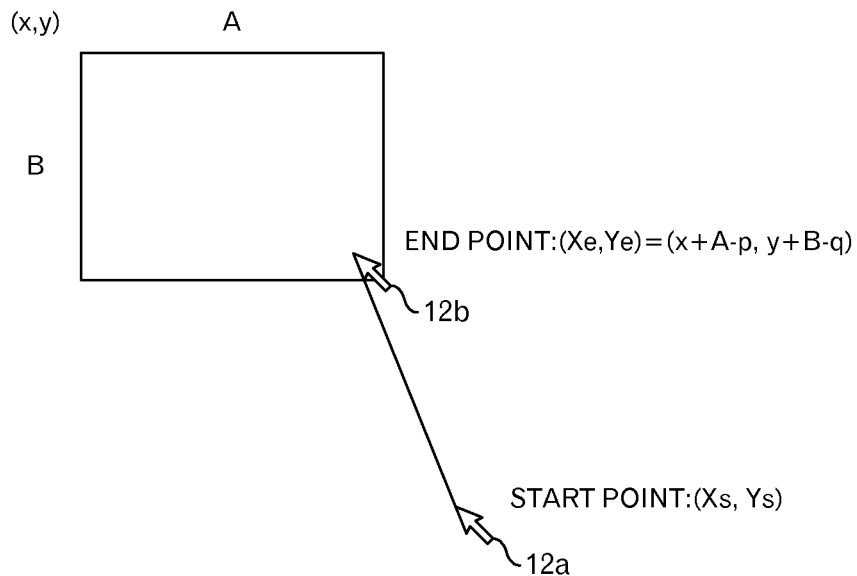
FIG. 12 is a diagram depicting a relationship between a start point and an end point of the mouse cursor.

FIG. 12 illustrates a relationship between the start point and the end point of the mouse cursor 12. In this figure, it is assumed that the origin is an upper left corner of the screen.

In this example, the position of the object (x, y) represents coordinates of the upper left edge of the rectangle of the object. Moreover, the size of the object (A, B) represents the horizontal width A and the vertical width B of the rectangle of the object. Therefore, the position of the lower right edge of the rectangle of the object can be calculated by a horizontal coordinate (x+A), which is calculated by adding the horizontal coordinate x of the object and the horizontal width A of the object, and a vertical coordinate (y+B), which is calculated by adding the vertical coordinate y of the object and the vertical width B of the object.

In this example, the position of the mouse cursor 12*a* represents coordinates of a hot spot of the mouse cursor 12*a*. Moreover, it is desired that the mouse click at the end point is recognized as an operation for the event, therefore, the hot spot of the mouse cursor 12*b* is adjusted so as to overlap with the inside of the object. Therefore, a coordinate for the horizontal axis is reduced by p dots from the lower right edge for the rectangle of the object toward the origin side, and a coordinate for the vertical axis is further reduced by q dots from the aforementioned lower right edge toward the origin. Accordingly, the end point is (x+A−p, y+B−q). p and q are 2 to 4 dots, for example.

Returning to FIG. 11, the setting unit 31 calculates the position of the lower right edge of the rectangle of the object, assuming the aforementioned positional relationship (S403). In other words, the setting unit 31 adds the size of the object (A, B) to the position of the object (x, y) to obtain the lower right position (x+A, y+B).

Furthermore, the setting unit 31 modifies the position by a very small width toward upper left (S405). According to the aforementioned positional relationship, the setting unit 31 subtracts adjustment widths (p, q) from the lower right position (x+A, y+B) to obtain the end point (x+A−p, y+B−q).

Returning to the determination of the type of the object (S401), which is illustrated in FIG. 11, when the type of the object 11 is the text input field, the setting unit 31 obtains a caret position from the operating system 2 (S407), and sets the obtained caret position as the end point.

When the hot spot is changed according to the change of the type of the mouse cursor 12, the end point may be modified by the difference. In such a case, the difference is calculated by subtracting the position of the hot spot before the change from the position of the hot spot after the change in the display range of the mouse cursor. Then, the position of the end point is modified by adding the difference to the position of the end point.

Returning to FIG. 6, the setting unit 31 performs a movement-vector calculation processing (S309) to calculate a movement vector to identify the movement direction and movement distance for one movement.

As for the movement-vector calculation processing (S309), three examples will be explained, an example that the mouse cursor always moves at constant speed, an example that the speed varies according to the distance between the start point and the end point while the time required for the movement between the start point and the end point is constant, and an example that the speed varies during the movement between the start point and the end point.

Firstly, along FIG. 13, an example that the mouse cursor always moves at constant speed will be explained. The setting unit 31 firstly calculates the start point (S501). Typically, the setting unit 31 uses the position of the mouse cursor, which was obtained at S305, as the start point.

When the hot spot is changed according to the change of the type of the mouse cursor 12, the start point may be modified by the difference. In such a case, the difference is calculated by subtracting the position of the hot spot before the change from the position of the hot spot after the change in the display area of the mouse cursor. Then, the start point is modified by the adding the difference to the start point.

Next, the setting unit 31 calculates the direction of the movement (S503). The setting unit 31 calculates the direction of the vector from the start point to the end point. The direction of the movement is the same as the direction of the vector from the start point to the end point.

The setting unit 31 calculates a vector having a predetermined length (S505). In this example, the vector length is constant, so the setting unit 31 calculates a vector that has the direction of the movement and the predetermined length, and stores the vector into the memory area 60 as the movement vector.

Figure 14:
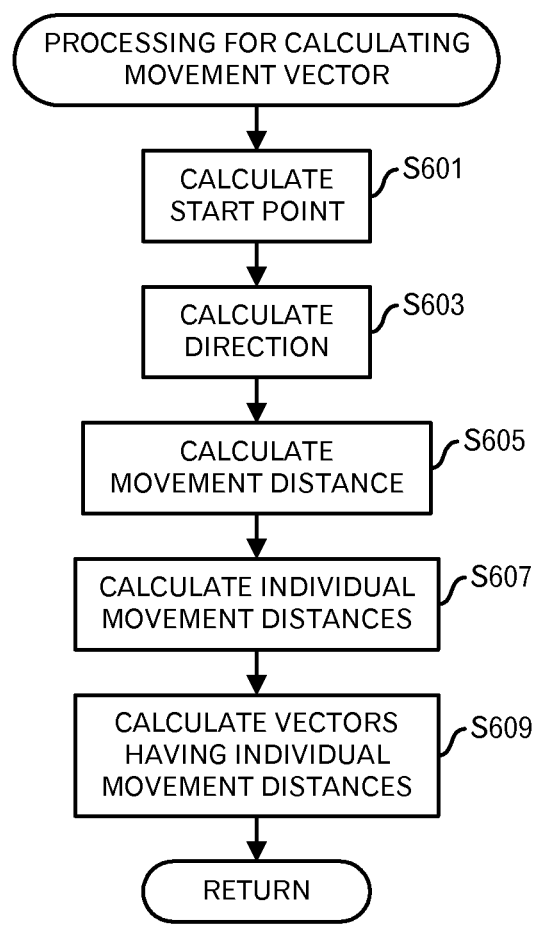
FIG. 14 is a diagram depicting a processing flow of the movement-vector calculation processing.

Next, along FIG. 14, the example that the time required for the movement between the start point and the end point is constant will be explained. In this example, when the movement distance is long, the mouse cursor quickly moves, and when the movement distance is short, the mouse cursor moves slowly.

Figure 13:
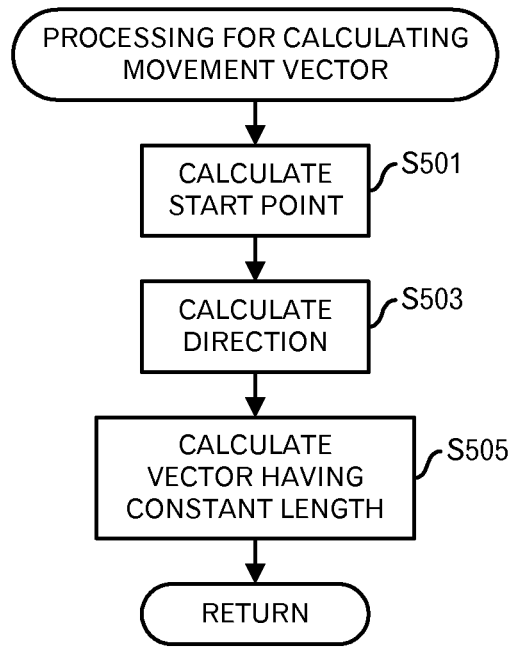
FIG. 13 is a diagram depicting a processing flow of a movement-vector calculation processing.

The calculation of the start point (S601) and the calculation of the direction (S603) are the same as those of S501 and S503 in FIG. 13, so the explanation is omitted.

The setting unit 31 calculates the movement distance (S605). Specifically, the setting unit 31 calculates the distance between the start point and the end point as the movement distance.

Next, the setting unit 31 calculates an individual movement distance (S607). Specifically, the setting unit 31 divides the movement distance by the predetermined number of times of the movement to calculate the individual movement distance.

Then, the setting unit 31 calculates an individual movement distance vector that has the direction of the movement and the individual movement distance (S609). In this case, the individual movement distance vector is common in each movement, so only one value is calculated. The setting unit 31 stores the individual movement distance vector in an area for the movement vector 69 in the memory area 60.

Figure 15:
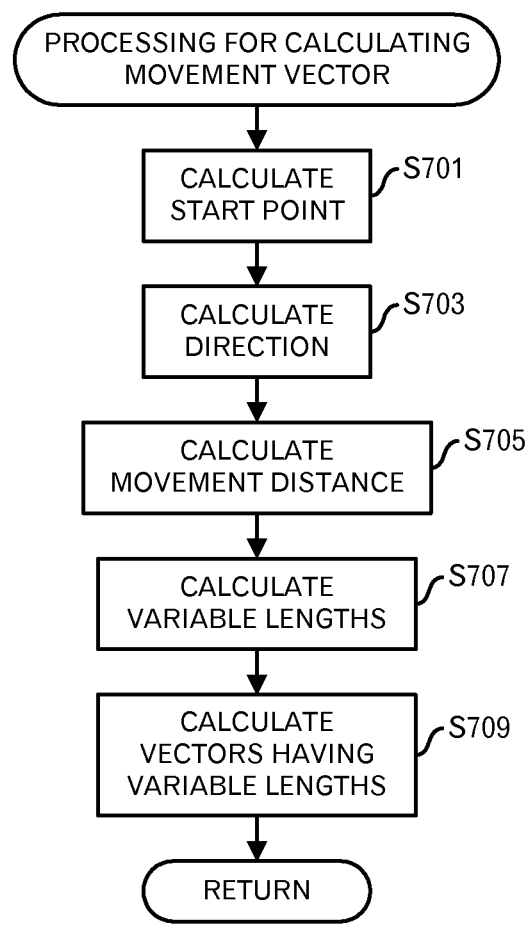
FIG. 15 is a diagram depicting a processing flow of the movement-vector calculation processing.

Finally, according to FIG. 15, the example that the speed varies during the movement between the start point and the end point will be explained. The calculation of the start point (S701) and the calculation of the direction (S703) are the same as those of S501 and S503 in FIG. 13. Therefore, the explanation is omitted. Moreover, the calculation of the movement distance (S705) is the same as that of S605 in FIG. 14, so the explanation is omitted.

The setting unit 31 calculates variable lengths (S707). For example, the setting unit 31 calculates amounts for each time of the movement. The calculation method is not limited, however, the setting unit 31 calculates variable lengths so that the total of the variable lengths is identical to the movement distance. It is effective that the setting unit 31 uses a function that draws a smooth curve to calculate function values for variable values of the number of times of the movement, and calculates variable lengths so as to be identical with the ratio of those function values. For example, when the movement is performed N−1 times, the variable lengths are set so as to be proportional to sin (π/N), sin (2π/N), sin (3π/N), . . . , sin ((N−1)π/N). According to this, the smooth movement can be realized.

Especially, it is effective that the variable lengths for the plural times of the movement immediately before the end point are shorter than the variable lengths near the middle point between the start point and the end point. Thus, the movement speed near the end point becomes slow, and it is possible to attract the attention to the position of the end point.

Moreover, the variable lengths for the plural times of the movement immediately after the start point may be shorter than the variable lengths near the middle point between the start point and the end point. Thus, the movement speed becomes slow at the beginning of the movement, and it is possible to reduce the discomfort caused by the automatic movement of the mouse cursor.

The setting unit 31 calculates variable-length vectors that have the direction of the movement and the variable lengths (S709). The setting unit 31 makes it possible to identify the variable-length vector each time of the movement. For example, the setting unit 31 calculates the variable-length vector for each time of the movement, and stores the variable-length vectors whose number is the same as the number of times of the movement in the area of the movement vector 69 in the memory area 60.

Returning to FIG. 6, the setting unit 31 determines whether the operating flag represents ON or OFF (S311). When the operating flag represents OFF, the setting (S313 to S319) to start control of the mouse cursor 12 is performed. When the operating flag represents ON, the processing ends, because the setting has already been performed.

The setting unit 31 registers the timer event for the operating system 2 (S313). Thus, a message of the timer event is notified from the operating system 2 to the message processing unit 20 at predetermined intervals. The setting unit 31 sets the predetermined interval that makes it possible to continuously see the movement of the mouse cursor 12 to a certain extent in the registration of the timer event. For example, the predetermined interval may be about 0.1 second. Thus, the user can follow the change of the position of the mouse cursor 12. Furthermore, the setting unit 31 designates the number of the timer event for the operating system 2. The setting unit 31 stores the designated number of the timer event in the area of the timer-event number 65 in the memory area 60.

The setting unit 31 further obtains the type of the mouse cursor 12 from the operating system 2, and stores the obtained type in the area of the original type of the mouse cursor 71 in the memory area 60 (S315). When information representing the type of the mouse cursor 12 is attached to the position of the mouse cursor, which was obtained at S305, the setting unit 31 may use it.

The setting unit 31 outputs an instruction to change the type of the mouse cursor 12 to the operating system 2 so as to realize a display shape or form of the mouse cursor, which represents that the mouse cursor is moving by this control (S317). Finally, the setting unit 31 sets ON to the operating flag 61 in the memory area 60 (S319).

As described above, the explanation for the focus-movement processing (S105) in FIG. 4, which includes the setting processing (S203) in FIG. 5, ends.

Next, the timer-event processing (S109) in FIG. 4 will be explained. As described above, in a state that the timer event has been registered, the message of the timer event is notified at predetermined intervals from the operating system 2. When this message is received, the timer-event processing (S109) by the timer-event processing unit 40 begins.

Figure 16:
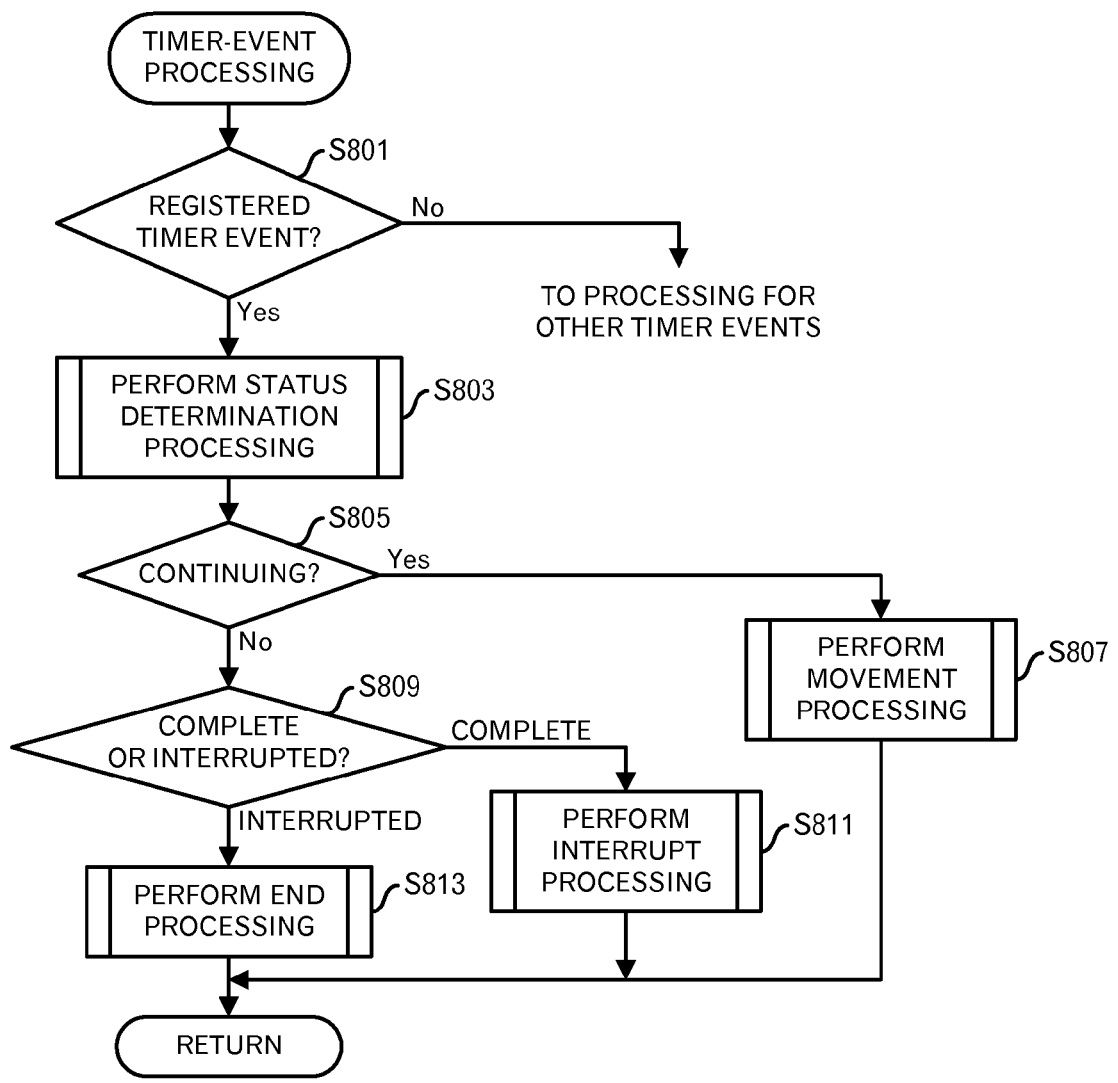
FIG. 16 is a diagram depicting a processing flow of a timer-event processing.

FIG. 16 illustrates a processing flow of the timer-event processing. The timer-event processing unit 40 determines whether or not the received timer event is the registered timer event (S801). Specifically, the timer-event processing unit 40 identifies the number of the timer event, which is attached to the received timer event, and compares the identified number with the timer-event number 65 stored in the memory area 60. When they are identical, it is confirmed that the registered timer event was received, the timer-event processing unit 40 continues the processing of S803 and subsequent processing. On the other hand, when they are not identical, the received timer event is not the registered timer event. Therefore, the processing shifts to a processing for other timer events. However, the processing for other timer events has no relation with this embodiment, so the explanation is omitted.

Figure 17:
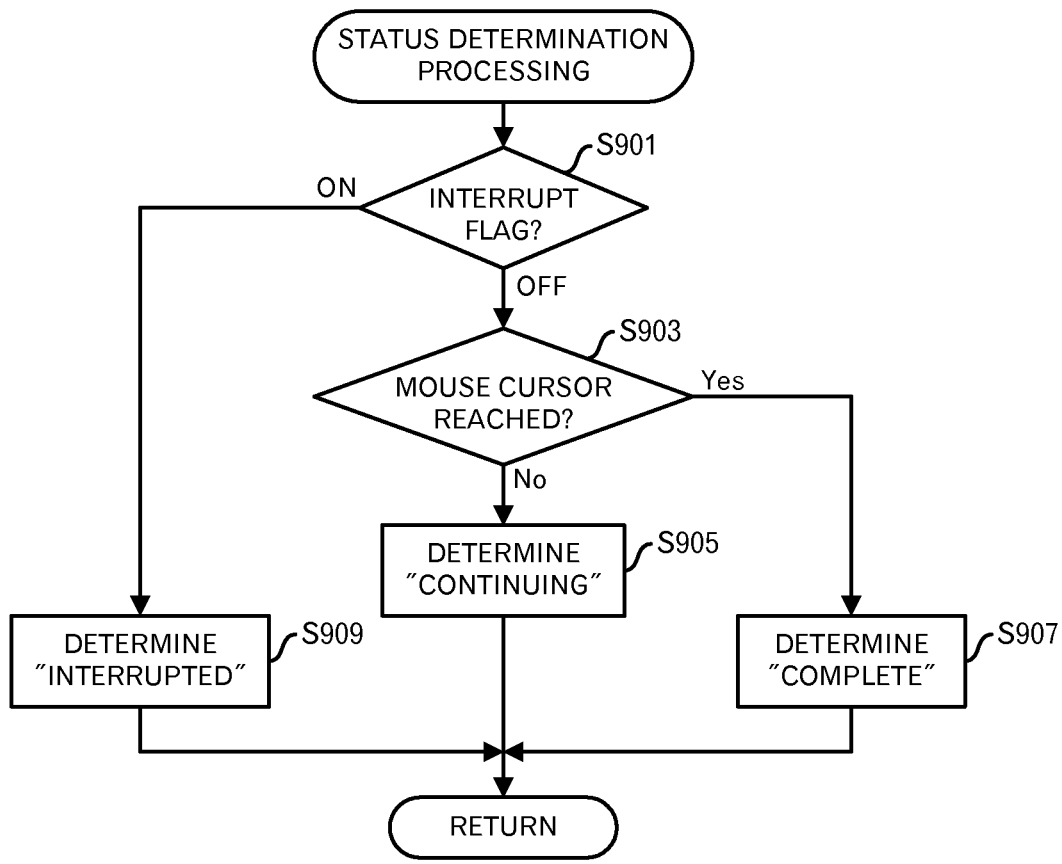
FIG. 17 is a diagram depicting a processing flow of a status determination processing.

Next, the status determination processing (S803) by the status determination unit 41 will be explained. FIG. 17 illustrates a processing flow of the status determination. The status determination unit 41 determines whether the interrupt flag 63 represents ON or OFF (S901). When the interrupt flag 63 represents ON, the status determination unit 41 determines that the status is "interrupted" (S909). The interrupt flag 63 is set by the interrupt determination unit 51. This processing will be explained by using FIG. 21 later.

When the interrupt flag 63 represents OFF, the status determination unit 41 determines whether or not the mouse cursor 12 reached the end point (S903). Specifically, the status determination unit 41 obtains the position of the mouse cursor 12 from the operating system 2, and compares the obtained position with the end point position 67. When the position of the mouse cursor 12 and the end point position 67 are identical, the status determination unit 41 determines that the mouse cursor 12 reached the end point, and determines that the status is "complete" (S907). On the other hand, when the position of the mouse cursor 12 and the end point position 67 are not identical, the status determination unit 41 determines that the mouse cursor 12 does not reach the end point, and determines that the status is "continuing" (S905).

Returning to FIG. 16, the timer-event processing unit 40 determines whether or not the status is "continuing" (S805). When the status that was determined in the status determination processing (S803) is "continuing", the processing shifts to a movement processing (S807) by the moving unit 43.

Figure 18:
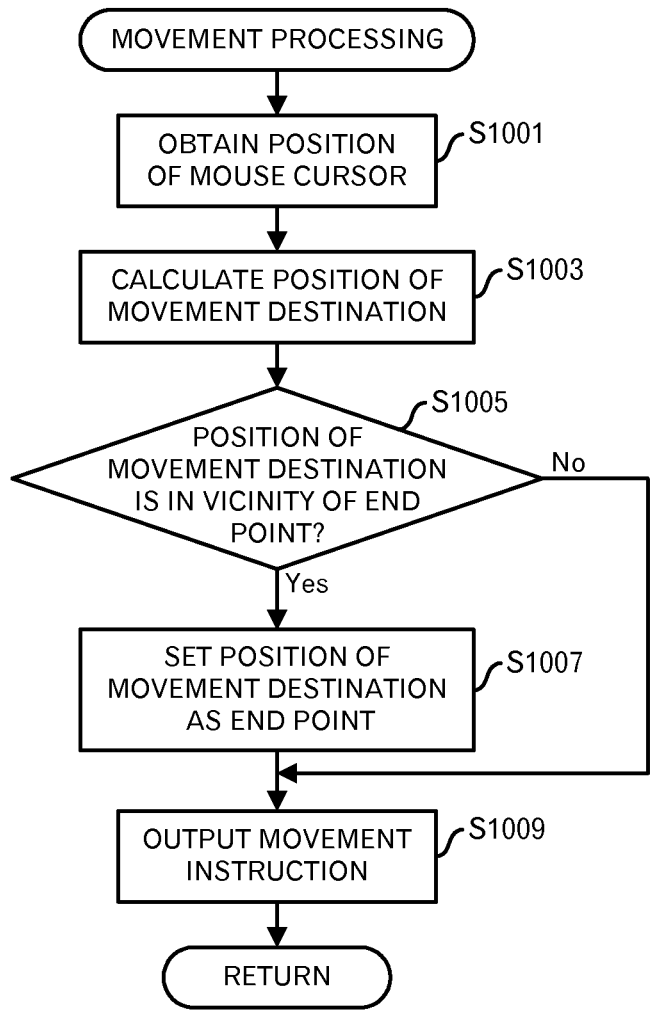
FIG. 18 is a diagram depicting a processing flow of a movement processing.

FIG. 18 illustrates a processing flow of the movement processing. Firstly, the moving unit 43 obtains the mouse cursor position from the operating system 2 (S1001). Next, the moving unit 43 reads out the movement vector 69, and adds the movement vector 69 to the mouse cursor position to calculate the movement destination position (S1003).

The moving unit 43 determines whether or not the movement destination is in the vicinity of the end point (S1005). The range of the vicinity in such a case includes the end point and a range that goes across the end point, and also further includes a range that is determined by assuming the difference caused by errors on the calculation of the direction and/or distance of the vector.

When the movement destination is in the vicinity of the end point, the moving unit 43 sets the end point as the movement destination position (S1007), and outputs a movement instruction of the mouse cursor 12 to the movement destination position to the operating system 2 (S1009). Thus, the final mouse cursor position is modified to the end point. On the other hand, when the movement destination is not in the vicinity of the end point, the moving unit 43 outputs a movement instruction of the mouse cursor 12 to the movement destination to the operating system 2 (S1009). Thus, the movement of the mouse cursor is repeated up to the end point.

Returning to FIG. 16, when the status is not "continuing", the timer-event processing unit 40 determines whether the status is "complete" or "interrupted" (S809). When the status is "complete", the processing shifts to an end processing (S811) by the ending unit 45.

Figure 19:
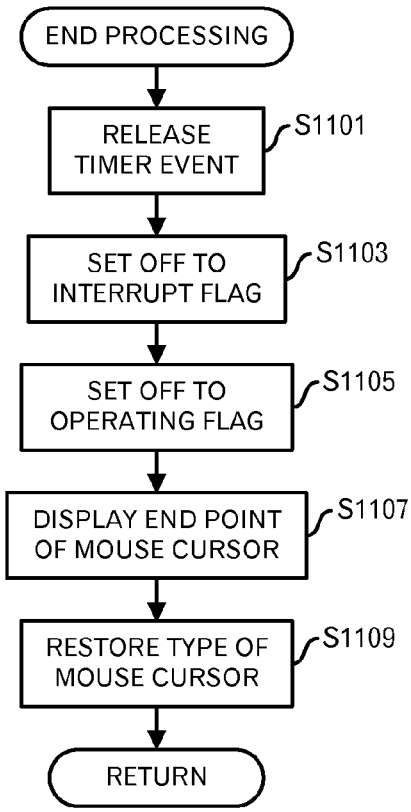
FIG. 19 is a diagram depicting a processing flow of an end processing.

FIG. 19 illustrates a processing flow of the end processing. The ending unit 45 releases the timer event (S1101). Specifically, the ending unit 45 outputs a release instruction of the timer event to the operating system 2, and clears the timer-event number 65 in the memory area 60.

The ending unit 45 further sets OFF to the interrupt flag 63 (S1103), and sets OFF to the operating flag 61 (S1105). Moreover, the ending unit 45 performs end point display of the mouse cursor 12 (S1107). The ending unit 45 performs animation display of the mouse cursor 12, for example. Specifically, the ending unit 45 outputs an instruction to change the type of the mouse cursor 12 to the operating system 2 plural times at intervals.

Moreover, the ending unit 45 restores the type of the mouse cursor 12 (S1109). Specifically, the ending unit 45 reads out the original type of the mouse cursor 71 in the memory area 60, and outputs the instruction to change to the original type of the mouse cursor to the operating system 2.

By performing the aforementioned operation, the movement of the mouse cursor 12 from the start point to the end point is completed.

Next, a case where the control of the mouse cursor 12 is interrupted according to an operation of the user will be explained. In this example, when a mouse operation of the user is detected, the control of the mouse cursor 12 is interrupted.

When the message processing unit 20 determines at S111 in FIG. 4 that the contents of the event represent the mouse movement, the processing shifts to a mouse-movement processing (S113) by the mouse-movement processing unit 50.

Figure 20:
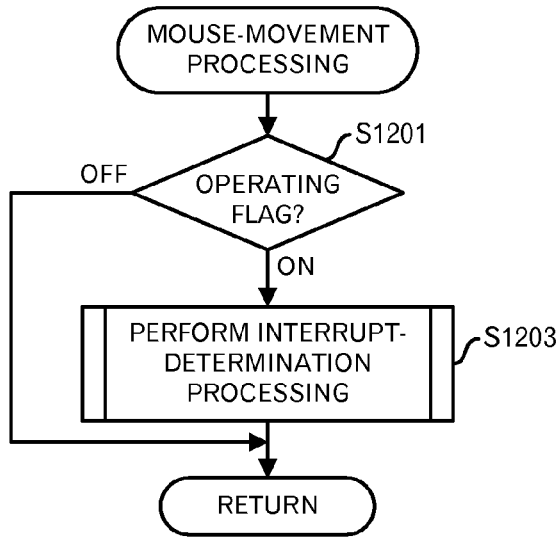
FIG. 20 is a diagram depicting a processing flow of a mouse-movement processing.

FIG. 20 illustrates a processing flow of the mouse-movement processing. The moving unit 43 determines whether the operating flag 61 is ON or OFF (S1201). When the operating flag is OFF, the processing ends, because the mouse cursor 12 is not controlled. When the operating flag is ON, the processing shifts to an interrupt-determination processing (S1203) by the interrupt determination unit 51.

Figure 21:
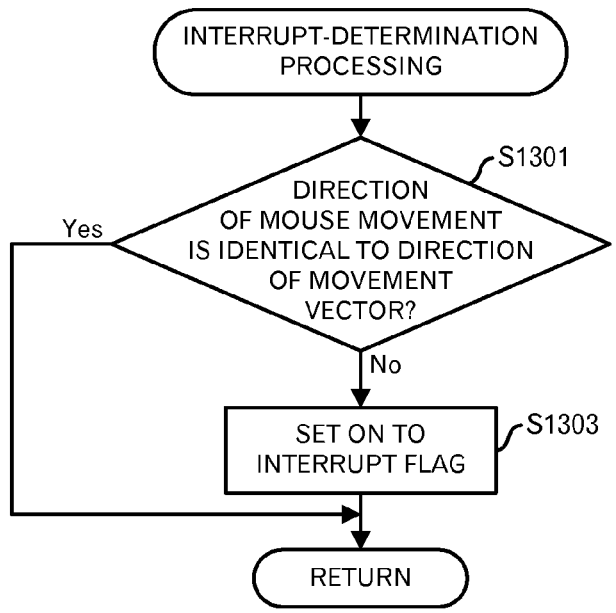
FIG. 21 is a diagram depicting a processing flow of an interrupt-determination processing.

FIG. 21 illustrates a processing flow of the interrupt-determination processing. The interrupt determination unit 51 determines whether or not the direction of the mouse movement is identical to the direction of the movement vector 69 by this control (S1301). The direction of the mouse movement can be identified from the vector of the mouse movement, which is included in the event of the mouse movement. When the direction of the mouse movement is identical to the direction of the movement vector 69 by this control, the processing ends, because the movement of the mouse cursor 12 by this control is assumed.

On the other hand, when the direction of the mouse movement is not identical to the direction of the movement vector 69 by this control, the interrupt determination unit 51 sets ON to the interrupt flag 63 and the processing ends, because the movement of the mouse cursor 12 by the mouse operation of the user is assumed (S1303).

In this example, only the identity of the direction is determined, however, the distance of the mouse movement may be compared with the length of the movement vector, and the identity of them may be added to the condition of the interruption.

When the message processing unit 20 receives the message to notify the timer event in a state where the interrupt flag 63 is ON, it is determined that the timer event is determined at S107 in FIG. 4, and the processing shifts to the timer-event processing of S109. Through S801 to S805 in the timer event processing illustrated in FIG. 16, the timer-event processing unit 40 determines at S809 that the status is "interrupted". Then, the processing shifts to an interrupt processing (S813) by the interrupt unit 47.

Figure 22:
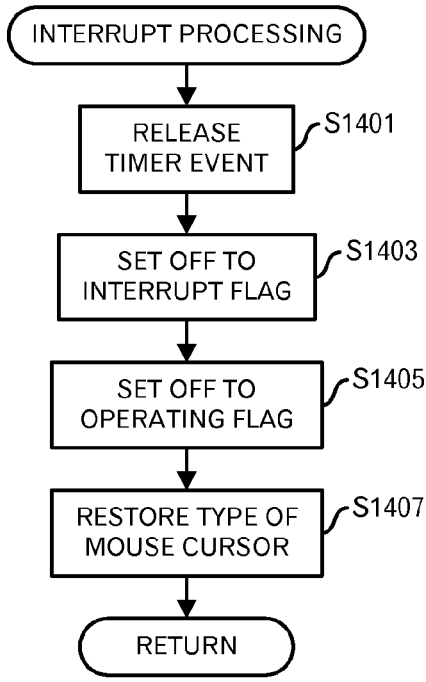
FIG. 22 is a diagram depicting a processing flow of an interrupt processing.

FIG. 22 illustrates a processing flow of the interrupt processing. The interrupt unit 47 releases the timer event, similarly to S1101 in the end processing illustrated in FIG. 19 (S1401). Furthermore, the interrupt unit 47 sets OFF to the interrupt flag 63, similarly to S1103 of the end processing illustrated in FIG. 19 (S1403), and sets OFF to the operating flag 61, similarly to S1105 in the end processing illustrated in FIG. 19 (S1405). Finally, the interrupt unit 47 restores the type of the mouse cursor 12, similarly to S1109 in the end processing illustrated in FIG. 19 (S1407).

Thus, the interrupt is complete. As described above, the explanation for the first embodiment ends.

[Embodiment 2]

In the first embodiment, an example was explained in which the mouse cursor controller 5 is provided in the application program 3 that displays the screen, however, in this embodiment, an example will be explained in which a resident program having the mouse cursor controller 5 is provided separately from the application program 3.

Figure 23:
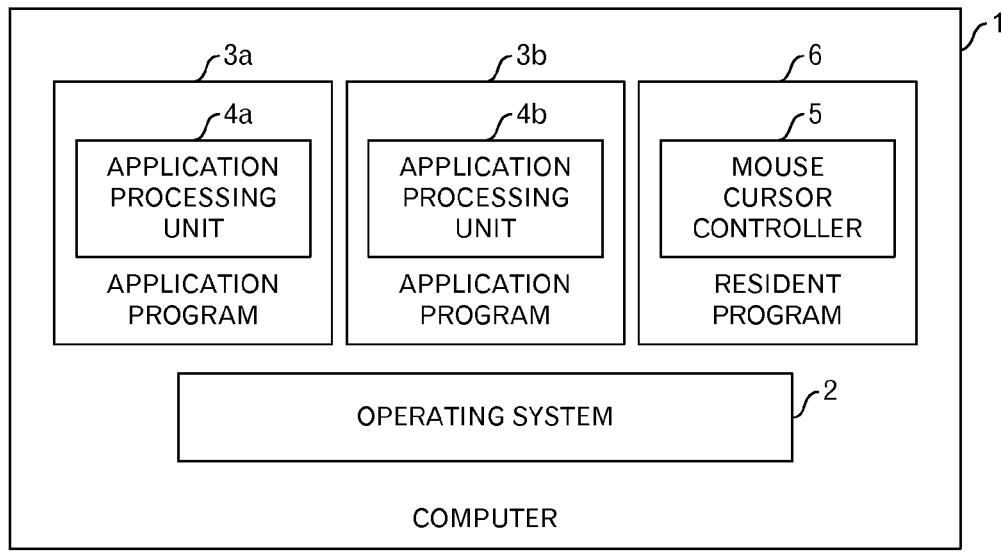
FIG. 23 is a diagram depicting a configuration example of programs in a second embodiment.

FIG. 23 illustrates a configuration example of programs in the second embodiment. A resident program 6 does not depend on processes of other application programs 3a and 3b, and resides as the independent process. The resident program 6 in this embodiment hooks a message to notify the event to the application program 3, and determines the contents of the event in the hooked message to operate according to the contents of the event.

Figure 24:
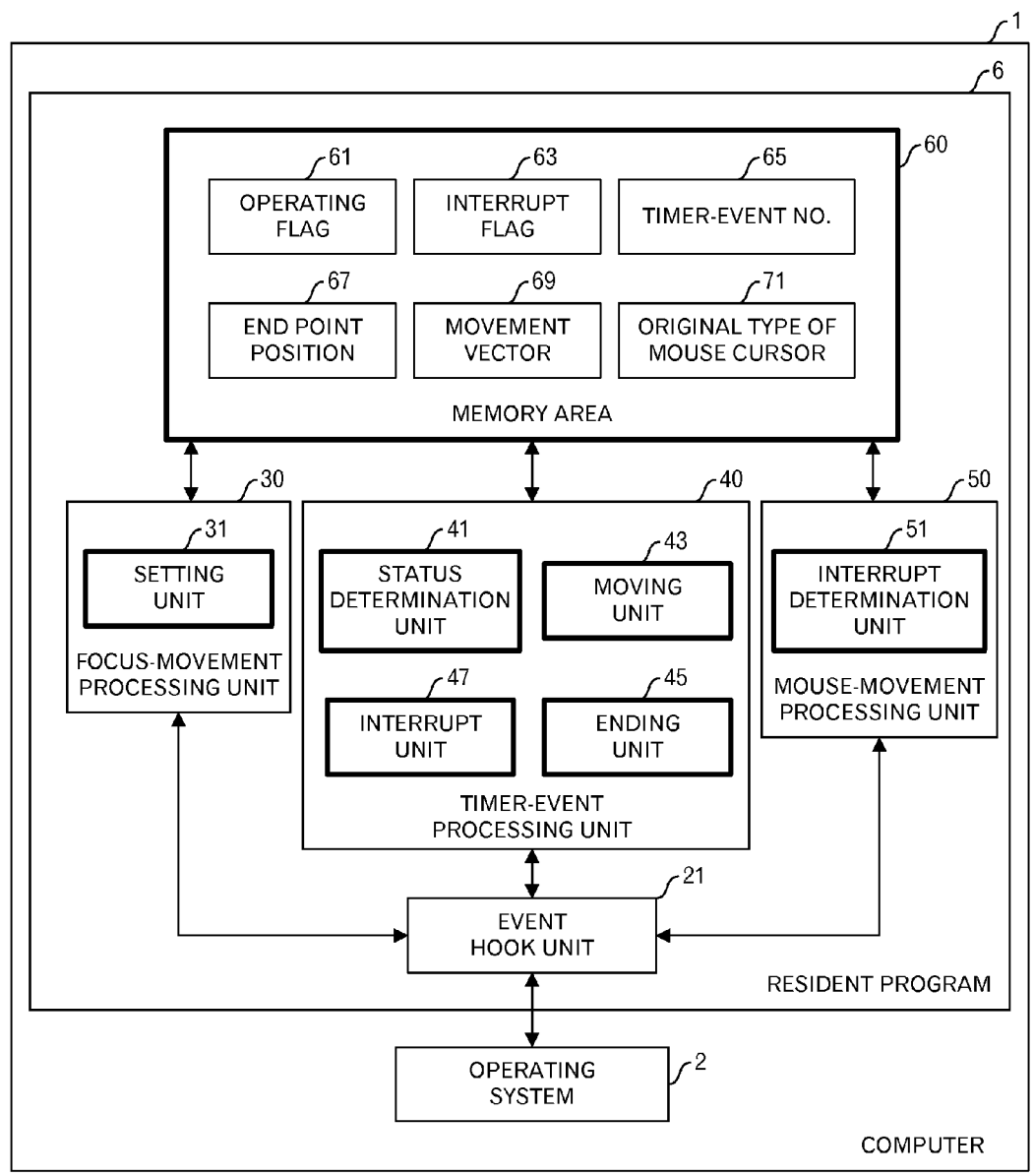
FIG. 24 is a diagram depicting a configuration example of a resident program in the second embodiment.

FIG. 24 illustrates a configuration example of the resident program 6 in the second embodiment. The resident program 6 has an event hook unit 21 instead of the message processing unit 20 in the first embodiment. Moreover, the object table 80 in the first embodiment is not included. In the following, different points with the first embodiment are mainly explained.

Figure 25:
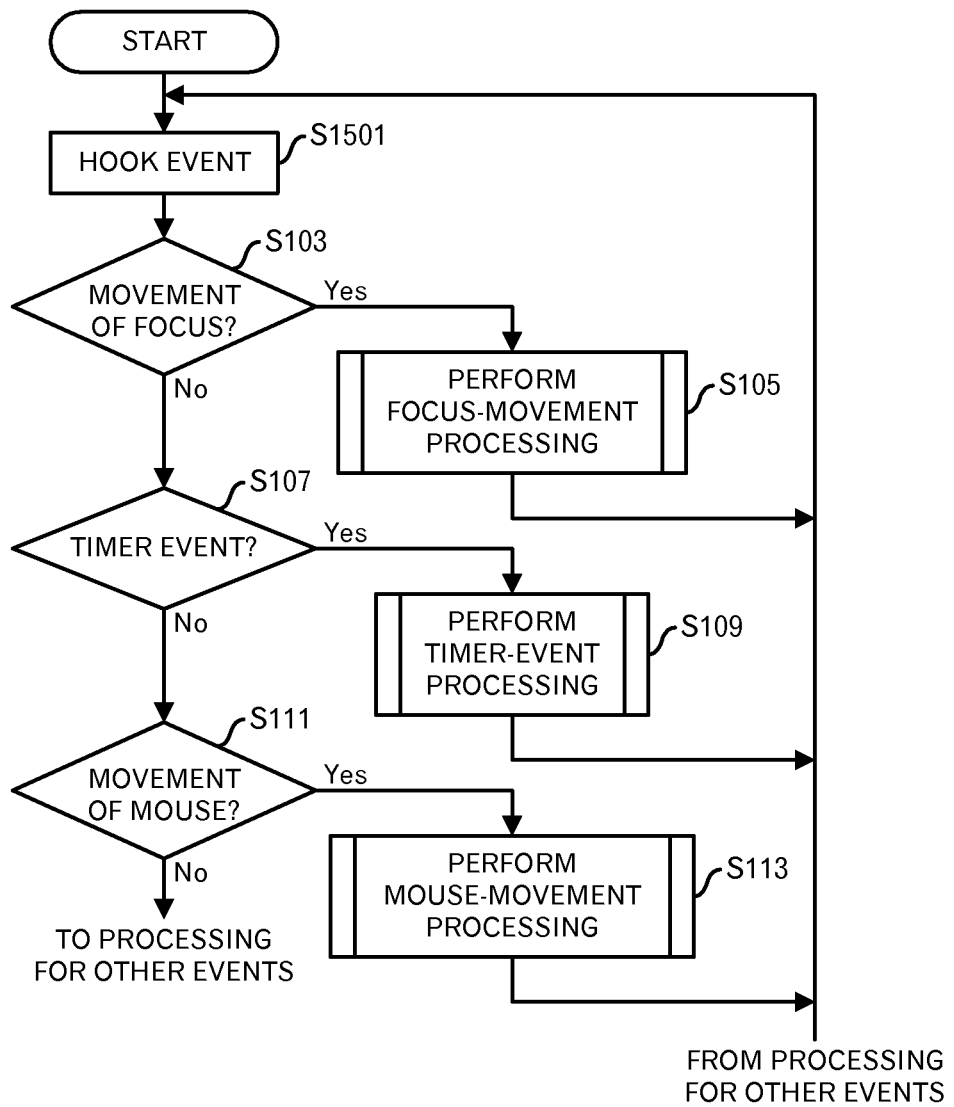
FIG. 25 is a diagram depicting a processing flow of an event hook processing.

An event hook processing by the event hook unit 21 will be explained. FIG. 25 illustrates a processing flow of the event hook processing. The event hook unit 21 hooks an event concerning the screen display (S1501). Specifically, the event hook unit 21 receives a message that is notified to processes of the application program 3a and 3b, and identifies the contents of the event. The processing of S103 to S113 is similar to FIG. 4.

In the setting processing illustrated in FIG. 6, the processing to identify the object (S301) and the processing to obtain the size, position and type of the object (S303) are different from the first embodiment. The explanation about those will be made.

The setting unit 31 identifies an application handle and an object ID, which is included in the event of the focus movement. Furthermore, the setting unit 31 obtains capture of the application program 3a or 3b identified by the application handle from the operating system 2. The capture includes information of the object 11 that is included in the window or dialog box, which is displayed on the screen by the application program 3a or 3b. The setting unit 31 extracts the size, position and type of the object corresponding to the object ID from the capture. The processing subsequent to S305 is similar to the first embodiment.

Thus, by hooking the event, and obtaining the information of the object from the operating system 2, it is possible to control the mouse cursor 12 while linking with the focus movement between objects, from the outside of the application programs 3a and 3b.

[Embodiment 3]

In this embodiment, an example that the mouse cursor controller 5 is provided in a mouse driver will be explained. Basically, a similar processing to the resident program is carried out by the mouse driver using the similar mechanism to the second embodiment.

Figure 26:
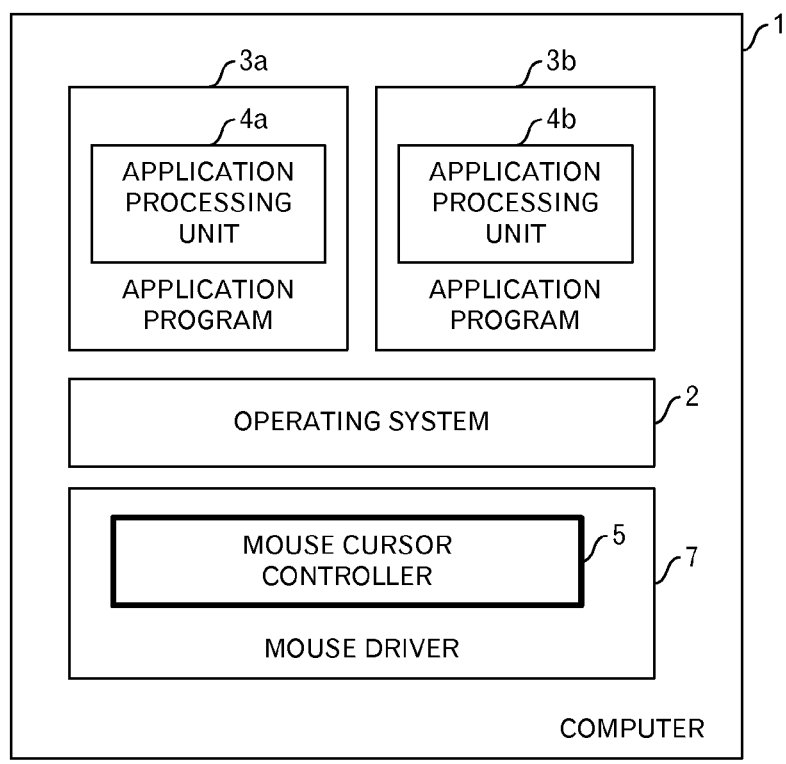
FIG. 26 is a diagram depicting a configuration example of programs in a third embodiment.

FIG. 26 illustrates a configuration example of programs in the third embodiment. The mouse driver 7 does not depend on the processes of the application program 3a or 3b and is independently resident, similarly to the resident program 6 in the second embodiment.

Similarly to the resident program 6 in the second embodiment, the mouse driver 7 hooks the message to notify the event to the application program 3a or 3b, determines the event and operates according to the contents of the event.

Figure 27:
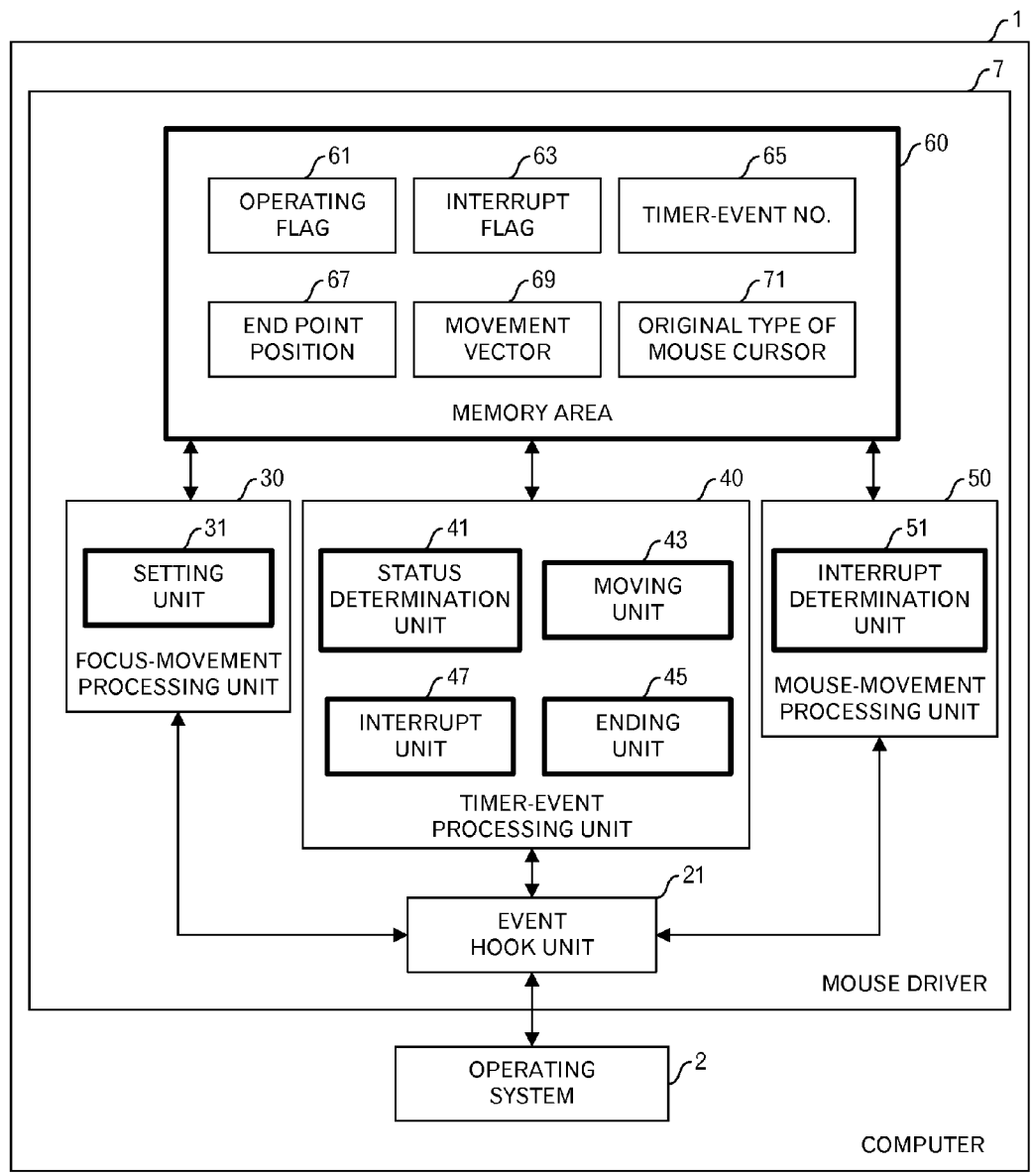
FIG. 27 is a diagram depicting a configuration example of a mouse driver in the third embodiment.

FIG. 27 illustrates a configuration example of the mouse driver 7 in the third embodiment. Similarly to the resident program 6 in the second embodiment, the mouse driver 7 has an event hook unit 21 instead of the message processing unit 20 in the first embodiment. Also in such a case, the object table 80 is not kept.

The processing to identify the object in the setting processing illustrated in FIG. 6 (S301) and to obtain the size, position and type of the object (S303) is similar to the second embodiment.

The mouse driver 7 keeps the information concerning the mouse operation such as the position of the mouse cursor 12. Therefore, the mouse driver 7 may not obtain the information from the operating system 2, and operates using the its own information.

Although the embodiments of this technique were explained above, this technique is not limited those. For example, the aforementioned functional block diagram may not correspond to an actual program module configuration.

Moreover, the aforementioned configuration of the respective memory areas is a mere example, and may be changed. Furthermore, as for the processing flow, as long as the processing results do not change, the turns of the steps may be exchanged, and furthermore plural steps may be executed in parallel.

Figure 28:
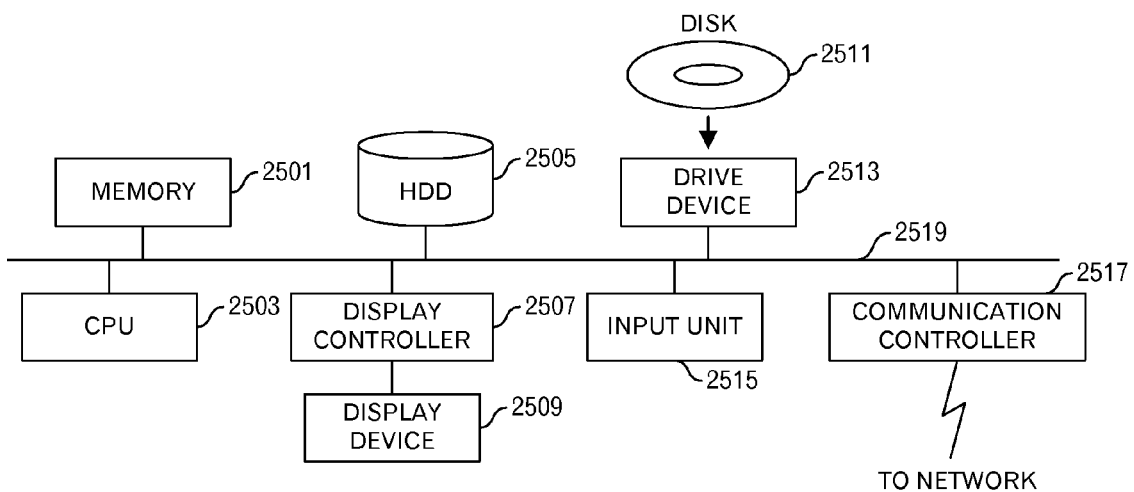
FIG. 28 is a functional block diagram of a computer.

In addition, the aforementioned the mouse cursor controller 5 is a computer device as illustrated in FIG. 28. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 28. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiments are outlined as follows:

A mouse cursor control method relating to the embodiments includes: (A) upon detecting an event that represents a focus was moved between plural objects displayed on a screen, identifying an object of a movement destination of the focus; (B) identifying a position of the object of the movement destination; (C) setting an end point to which a mouse cursor is moved, based on the position of the object of the movement destination; and (D) performing first movement of the mouse cursor to a position that is nearer to the end point, first plural times, until the position of the mouse cursor reaches the end point.

By doing so, a movement locus that goes toward the object of the movement destination of the focus is displayed. Therefore, it is possible to guide the viewpoint of the user to the object of the movement destination of the focus. Moreover, because the position of the mouse cursor is moved to the object of the movement destination of the focus in plural installments, it is easy for the user to visually capture the mouse cursor that is moving.

Furthermore, because the focus that is moving is followed any time by the mouse cursor not only when a window is opened but also in a state that the window has been opened, the embodiments do not confuse the user even in case of a window that includes a lot of data input fields or selection items.

Moreover, in the aforementioned cursor control method, when the movement of the focus occurs by any operation by a device (e.g. keyboard) other than a device for inputting an instruction to move the mouse cursor, the setting may be performed.

Accordingly, the focus movement by the user's operation for the mouse, flat point, mouse tablet or the like is not prevented by the embodiments.

Moreover, the aforementioned setting may include identifying a size of the object of the movement destination; and setting the end point based on the position and the size of the object of the movement destination.

By doing so, the display of the object is not damaged, and it becomes possible to set the end point that is suitable to prompt the data input into the object or selection of the object.

Moreover, the aforementioned mouse cursor control method may further include: identifying a present position of the mouse cursor; and calculating a movement vector having a direction from the identified present position to the end point. In such a case, the performing may include repeating the first movement of the mouse cursor according to the movement vector.

Accordingly, because the movement of the mouse cursor begins from the present position of the mouse cursor, it is easy to prompt the recognition of the user.

Moreover, the aforementioned performing may include repeating the first movement of the mouse cursor at intervals and with a movement distance. In such a case, the interval and movement distance are determined so that the user can follow positional changes of the mouse cursor due to the movement.

By doing so, it becomes easy for the user to recognize the movement of the mouse cursor. Furthermore, it is possible to prevent from losing sight of the mouse cursor, and the feeling of the abruptness is not caused.

Moreover, in the aforementioned performing, a first movement speed in the first movement for second plural times immediately before the position of the mouse cursor reaches the end point among the first plural times may be set so as to be slower than a second movement speed at a position near a middle point between the position of the mouse cursor and the end point.

By doing so, it is possible to attract the attention to the object that is pointed by the end point. Moreover, the prediction of the end point becomes easy.

Furthermore, the aforementioned mouse cursor control method may further include: upon determining that second movement of the mouse cursor by a mouse operation of a user occurred, interrupting the first movement of the mouse cursor in the performing.

By doing so, even when the user operates the mouse, flat point, mouse tablet or the like during the movement of the mouse cursor, it is possible not to prevent that operation.

Moreover, the aforementioned mouse cursor control method may further include changing a display shape or form or mode of the mouse cursor.

By doing so, the display shape of the mouse cursor during the movement is changed, therefore, it is possible for the user to recognize the movement of the mouse cursor, which follows the movement of the focus.

Furthermore, the aforementioned mouse cursor control method may further include: upon detecting that the position of the mouse cursor reached the end point, restoring a display shape or form of the mouse cursor.

By doing so, the display shape or form of the mouse cursor returns to the original shape or form, therefore, the state before and after the movement of the mouse cursor is maintained, and it is possible not to cause the sense of incompatibility on the operation.

Furthermore, the aforementioned mouse cursor control method may further include: upon detecting that the position of the mouse cursor reached the end point, displaying animation display of the mouse cursor.

By doing so, it is possible to cause the user to recognize that the focus is on the object on which the mouse cursor is disposed, and the movement linked with the movement of the focus ends.

Moreover, the setting may include, by hooking an event with respect to a process to display the screen, detecting an event that represents that the focus has been moved between plural objects displayed on the screen.

Hence, it is possible to realize the focus movement linked with the mouse cursor for various application programs without adding any modification to the application programs.

Moreover, the aforementioned setting may further include: identifying a type of the object of the movement destination; and setting the end point to which the mouse cursor is moved, based on the position of the object of the movement destination, the size of the object of the movement destination and the type of the object of the movement destination.

By doing so, it is possible to set the appropriate end point according to the type of the object.

Moreover, the aforementioned setting may include: upon detecting that a type of the object of the movement destination is a text input field, identifying a position of a caret included in the text input field; and setting the identified position of the caret as the end point to which the mouse cursor is moved.

By doing so, without damaging the display of the text data that has already been inputted, it is possible to prompt additional inputs of the text data.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
   upon detecting an event that represents movement of a focus between plural objects displayed on a screen, determining whether the focus was moved by a first user operation with respect to a first input device or by a second user operation with respect to a second input device in which the second input device is configured to input instructions to move a mouse cursor;
   upon determining that the focus was moved by the first user operation, identifying an object of a movement destination of the focus;
   identifying a position of the object of the movement destination;
   setting an end point to which the mouse cursor is moved, based on the position of the object of the movement destination; and
   performing processing for moving the mouse cursor to the end point, and
   wherein the processing for moving the mouse cursor to the end point comprises:
   identifying a position of the mouse cursor;
   outputting an instruction to move the mouse cursor to a position that is nearer to the end point than the identified position of the mouse cursor; and
   repeating the identifying of the mouse cursor and the outputting of the instruction to move the mouse cursor until the position of the mouse cursor reaches the end point.

2. The non-transitory computer-readable storage medium as set forth in claim 1, wherein the outputting of the instruction to move the mouse cursor comprises outputting, for plural times immediately before the position of the mouse cursor reaches the end point, the instruction to move the mouse cursor at a first movement speed that is slower than a second movement speed at a position near a middle point between a start point of the mouse cursor and the end point.

3. The non-transitory computer-readable storage medium as set forth in claim 1, wherein the process further comprises upon determining that movement of the mouse cursor by a mouse operation of a user occurred, interrupting the processing for moving the mouse cursor to the end point.

4. The non-transitory computer-readable storage medium as set forth in claim 1, wherein the setting comprises:
upon detecting that a type of the object of the movement destination is a text input field, identifying a position of a caret included in the text input field; and
setting the identified position of the caret as the end point.

5. The non-transitory computer-readable storage medium as set forth in claim 1, wherein the setting comprises:
identifying a size of the object of the movement destination;
identifying a type of the object of the movement destination; and
setting the end point based on the position of the object of the movement destination, the size of the object of the movement destination, and the type of the object of the movement destination.

6. A mouse cursor control method, comprising:
upon detecting an event that represents movement of a focus between plural objects displayed on a screen, determining whether the focus was moved by a first user operation with respect to a first input device or by a second user operation with respect to a second input device in which the second input device is configured to input instructions to move a mouse cursor;
upon determining that the focus was moved by the first user operation, identifying, by using a processor, an object of a movement destination of the focus;
identifying, by using the processor, a position of the object of the movement destination;
setting, by using the processor, an end point to which the mouse cursor is moved, based on the position of the object of the movement destination; and
performing, by using the processor, processing for moving the mouse cursor to the end point, and
wherein the processing for moving the mouse cursor to the end point comprises:
identifying a position of the mouse cursor;
outputting an instruction to move the mouse cursor to a position that is nearer to the end point than the identified position of the mouse cursor; and
repeating the identifying of the mouse cursor and the outputting of the instruction to move the mouse cursor until the position of the mouse cursor reaches the end point.

* * * * *